United States Patent [19]

Carson

[11] 3,755,307

[45] Aug. 28, 1973

[54] 5-CINNAMOYL-PYRROLE-2-ACETIC ACIDS AND ESTERS

[75] Inventor: John Robert Carson, Norristown, Pa.

[73] Assignee: McNeill Laboratories, Inc., Fort Washington, Pa.

[22] Filed: Jan. 21, 1972

[21] Appl. No.: 219,862

[52] U.S. Cl. .............................. 260/240 J, 424/274
[51] Int. Cl. ........................................ C07d 27/22
[58] Field of Search ................................. 260/240 J

[56] References Cited
OTHER PUBLICATIONS

Turbanti et al., Chimica Therapeutica, Vol. II, pages 354 to 365, (1967).

Randall et al., published application 62,242 (Jan. 22, 1952)–published in 654 OG 1152 through pages 1154 in abstract form.

*Primary Examiner*—John D. Randolph
*Attorney*—Salvatore R. Conte et al.

[57] ABSTRACT

Compounds of the class of 5-acyl-pyrrole-2-acetic acids useful for their analgetic activity and the corresponding lower-alkyl esters used as precursors thereof.

5 Claims, No Drawings

5-CINNAMOYL-PYRROLE-2-ACETIC ACIDS AND ESTERS

BACKGROUND OF THE INVENTION

The invention pertains to the field of 5-cinnamoyl-pyrrole-2-acetic acids which demonstrate analgetic activity. The subject acids differ in structure from the prior art (see Belgian Patent No. 762,060) by having a cinnamoyl function in the 5-position rather than a benzoyl function.

DESCRIPTION OF THE PREFERRED EMBODIMENTS

The novel 5-cinnamoyl-pyrrole-2-acetic acids of this invention may be structurally represented by the formula:

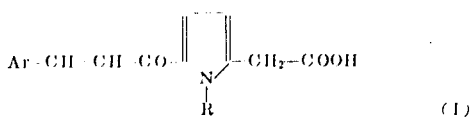

(I)

wherein Ar is a member selected from the group consisting of phenyl, halophenyl, loweralkylphenyl and loweralkoxyphenyl; and R is a member selected from the group consisting of hydrogen and loweralkyl, preferably methyl.

As used herein, "loweralkyl" and "loweralkoxy" may be straight or branch chained and have from 1 to about 5 carbon atoms, such as, for example, methyl, ethyl, propyl, isopropyl, butyl, pentyl and the like alkyls, and respectively, methoxy, ethoxy, propoxy, isopropoxy, butoxy, pentoxy and the like alkoxys. The term "halo" is generic to chloro, bromo, fluoro and iodo, preferably chloro.

The compounds of formula (I) may be prepared by a Friedel-Crafts reaction between an appropriate cinnamoyl halide (II), preferably the chloride, and an appropriate loweralkyl N-R-pyrrole-2-acetate (III) in the presence of a Lewis acid, preferably a metallic halide such as aluminum chloride, stannic chloride and the like, in a suitable solvent such as is typically employed in a Friedel-Crafts reaction, for example, methylene chloride, 1,2-dichloroethane, carbon disulfide, nitrobenzene and the like, followed by conversion of the thus-obtained 5-cynnamoyl-pyrrole-2-acetic acid ester (IV) to the corresponding free carboxylic acid form (I) by conventional ester-to-acid hydrolysis, for example, by refluxing the ester with aqueous alkali. The foregoing reactions may be illustrated by the following schematic diagram:

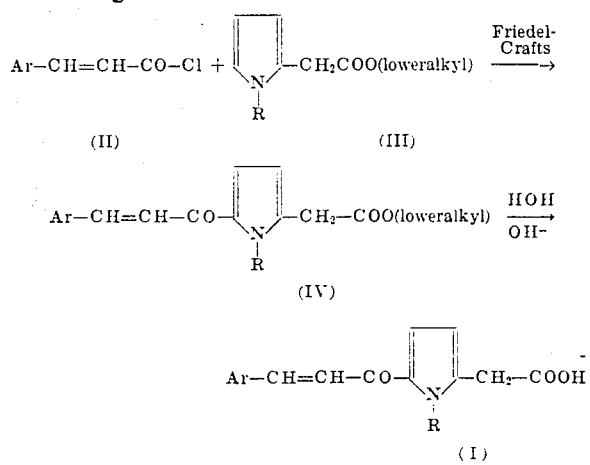

The cinnamoyl chlorides (II) are generally known and may be obtained by transformation of the corresponding cinnamic acid to the acid chloride form according to conventional procedures, for example, by treatment of the acid with thionyl chloride, preferably under reflux.

The acids of formula (V) possess analgetic activity as demonstrated in the phenylquinone-induced writhing test in mice [see literature reference: E. Siegmund et al., Proc. Soc. Exp. Biol. Med., 95, 729 (1957)] at doses ranging from 50–250 mg./kg. body weight. For example, with 5-cinnamoyl-1-methylpyrrole-2-acetic acid (*), the most preferred species, the following results, which indicate the number of animals writhing in a group of 10, are obtained in this test:

| | Time Interval (mins.) After oral administration | | | |
|---|---|---|---|---|
| | 0 | 15 | 30 | 45 |
| (*), at 100 mg./kg. | 3/10 | 3/10 | 2/10 | 2/10 |
| Control | 9/10 | 9/10 | 6/10 | 3/10 |

The esters of formula (IV) are also deemed to be novel and, in view of their utility as precursors for preparing the acids of formula (I), they constitute an additional feature of this invention.

The following examples are intended to illustrate, but not to limit, the scope of the present invention.

EXAMPLE I

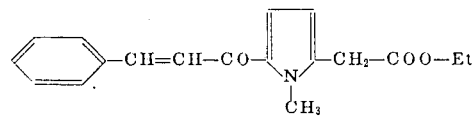

Ethyl 5-cinnamoyl-1-methylpyrrole-2-acetate

A suspension of 22 g. (0.020 mole) aluminum chloride in 120 ml. methylene chloride is cooled externally with an ice bath. To this is added 33.2 g. (0.02 mole) of melted cinnamoyl chloride all at once. The resultant solution is added dropwise (over 15 minutes) to a solution of 33.2 g. (0.020 mole) ethyl 1-methylpyrrole-2-acetate in 120 ml. methylene chloride while cooling externally with an ice bath. After the addition, the ice bath is removed and the solution stirred for 45 minutes, and then poured into ice acidified with dilute hydrochloric acid. The organic phase is separated and washed consecutively with 3N hydrochloric acid, N,N-dimethyl-1,3-propanediamine, 3N hydrochloric acid and saturated sodium chloride solution, and then dried with anhydrous magnesium sulfate. The solvent is evaporated. The residue is dissolved in benzene and chromatographed on a column packed with two pounds of acid washed alumina. It is eluted with benzene and the front running material is collected. The solvent is evaporated. The product, ethyl 5-cinnamoyl-1-methylpyrrole-2-acetate, is isolated from the residue upon trituration with methanol and purified by recrystallization in methanol; m.p. 51°–53°C.

EXAMPLE II

By repeating the acylation procedure of Example I, except that an equivalent quantity each of p-chloro-, σ-chloro-, p-bromo-, p-methyl-, p-methoxy- and p-ethoxy-cinnamoyl chloride, dissolved in methylene chloride, is used as the acylating agent in place of the cinnamoyl chloride used therein, there are obtained, as respective products, the following:

ethyl 5-(p-chloro-cinnamoyl)-1-methylpyrrole-2-acetate;

ethyl 5-(o-chloro-cinnamoyl)-1-methylpyrrole-2-acetate;
ethyl 5-(p-bromo-cinnamoyl)-1-methylpyrrole-2-acetate;
ethyl 5-(p-methyl-cinnamoyl)-1-methylpyrrole-2-acetate;
ethyl 5-(p-methoxy-cinnamoyl)-1-methylpyrrole-2-acetate; and
ethyl 5-(p-ethoxy-cinnamoyl)-1-methylpyrrole-2-acetate.

EXAMPLE III

The procedure of Example I is followed, except that an equivalent quantity of ethyl pyrrole-2-acetate is used in place of the ethyl 1-methyl-pyrrole-2-acetate used therein, and an equivalent amount of an appropriate cinnamoyl chloride acylating agent is used, to yield, as the final respective products:
ethyl 5-cinnamoyl-pyrrole-2-acetate;
ethyl 5-(p-chloro-cinnamoyl)-pyrrole-2-acetate;
ethyl 5-(p-methyl-cinnamoyl)-pyrrole-2-acetate; and
ethyl 5-(p-ethoxy-cinnamoyl)-pyrrole-2-acetate.

EXAMPLE IV

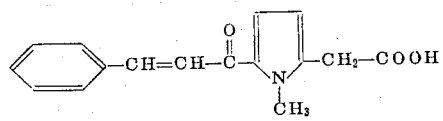

5-Cinnamoyl-1-methylpyrrole-2-acetic acid

A solution of 2.34 g. (7.9 × 10⁻³ mole) ethyl 5-cinnamoyl-1-methylpyrrole-2-acetate in 10 ml. methanol is brought to reflux. To the refluxing solution is added 8.3 ml. of 1N sodium hydroxide dropwise. After the addition, the solution is heated at reflux for 15 minutes. The methanol is then evaporated. The resultant suspension is poured into dilute hydrochloric acid. A precipitate of 5-cinnamoyl-1-methylpyrrole-2-acetic acid forms which is collected by filtration and purified by recrystallization in methanol; m.p. 170°–2°C.

EXAMPLE V

The hydrolysis procedure of Exampe IV is repeated, except that an equivalent quantity of each of the esters obtained in Examples II and III are used in place of the ethyl 5-cinnamoyl-1-methylpyrrole-2-acetate used in Example IV, to yield the following respective products:
5-(p-chloro-cinnamoyl)-1-methylpyrrole-2-acetic acid;
5-(o-chloro-cinnamoyl)-1-methylpyrrole-2-acetic acid;
5-(p-bromo-cinnamoyl)-1-methylpyrrole-2-acetic acid;
5-(p-methyl-cinnamoyl)-1-methylpyrrole-2-acetic acid;
5-(p-methoxy-cinnamoyl)-1-methylpyrrole-2-acetic acid;
5-(p-ethoxy-cinnamoyl)-1-methylpyrrole-2-acetic acid;
5-cinnamoyl-pyrrole-2-acetic acid;
5-(p-chloro-cinnamoyl)-pyrrole-2-acetic acid;
5-(p-methyl-cinnamoyl)-pyrrole-2-acetic acid; and
5-(p-ethoxy-cinnamoyl)-pyrrole-2-acetic acid.

I claim:
1. A 5-cinnamoyl-pyrrole-2-acetic acid of the formula:

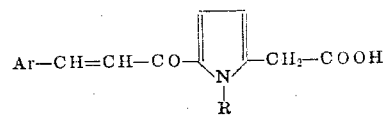

wherein Ar is a member selected from the group consisting of phenyl, halophenyl, loweralkylphenyl and loweralkoxyphenyl; and R is a member selected from the group consisting of hydrogen and loweralkyl.
2. 5-Cinnamoyl-1-methylpyrrole-2-acetic acid.
3. A loweralkyl 5-cinnamoyl-pyrrole-2-acetate of the formula:

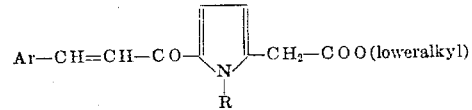

wherein Ar is a member selected from the group consisting of phenyl, halophenyl, loweralkylphenyl and loweralkoxyphenyl; and R is a member selected from the group consisting of hydrogen and loweralkyl.
4. Loweralkyl 5-cinnamoyl-1-methylpyrrole-2-acetate.
5. Ethyl 5-cinnamoyl-1-methylpyrrole-2-acetate.

* * * * *